(12) United States Patent
Xu et al.

(10) Patent No.: US 7,949,049 B2
(45) Date of Patent: *May 24, 2011

(54) MEMORY EFFICIENT 3-D WAVELET TRANSFORM FOR VIDEO CODING WITHOUT BOUNDARY EFFECTS

(75) Inventors: Jizheng Xu, Beijing (CN); Shipeng Li, Princeton, NJ (US); Ya-Qin Zhang, West Windsor, NJ (US); Zixiang Xiong, College Station, TX (US)

(73) Assignee: Microsoft Corporation, Redmond, WA (US)

( * ) Notice: Subject to any disclaimer, the term of this patent is extended or adjusted under 35 U.S.C. 154(b) by 1472 days.

This patent is subject to a terminal disclaimer.

(21) Appl. No.: 10/897,273

(22) Filed: Aug. 6, 2004

(65) Prior Publication Data

US 2004/0258157 A1 Dec. 23, 2004

Related U.S. Application Data

(63) Continuation of application No. 09/599,807, filed on Jun. 21, 2000, now Pat. No. 6,795,504.

(51) Int. Cl.
*H04N 11/02* (2006.01)
*H04N 7/12* (2006.01)

(52) U.S. Cl. ............... 375/240.19; 375/240.18

(58) Field of Classification Search .......... 375/240.01–240.06, 240.12–240.16, 375/240.26

See application file for complete search history.

(56) References Cited

U.S. PATENT DOCUMENTS

| | | | | |
|---|---|---|---|---|
| 5,777,678 A * | 7/1998 | Ogata et al. | ............... | 375/240.11 |
| 5,845,243 A | 12/1998 | Smart et al. | | |
| 5,923,376 A * | 7/1999 | Pullen et al. | ............... | 375/240.16 |
| 5,966,465 A * | 10/1999 | Keith et al. | ............... | 382/232 |
| 6,018,753 A * | 1/2000 | Kovacevic et al. | ............ | 708/313 |
| 6,125,143 A * | 9/2000 | Suzuki et al. | ............. | 375/240.11 |
| 6,182,018 B1 * | 1/2001 | Tran et al. | ............... | 702/66 |
| 6,373,895 B2 * | 4/2002 | Saunders et al. | .......... | 375/240.19 |
| 6,377,280 B1 | 4/2002 | Acharya et al. | | |
| 6,381,280 B1 * | 4/2002 | Lynch et al. | ............. | 375/240.19 |
| 6,499,045 B1 * | 12/2002 | Turney et al. | ................. | 708/401 |
| 6,606,412 B1 * | 8/2003 | Echigo et al. | ................. | 382/224 |
| 6,640,015 B1 * | 10/2003 | Lafruit et al. | ................. | 382/260 |
| 6,665,444 B1 * | 12/2003 | Kajiwara | ....................... | 382/240 |
| 7,130,351 B1 * | 10/2006 | Lynch et al. | ............. | 375/240.16 |

* cited by examiner

*Primary Examiner* — David Czekaj
(74) *Attorney, Agent, or Firm* — Lee & Hayes, PLLC

(57) ABSTRACT

A video coding system and method utilizes a 3-D wavelet transform that is memory efficient and reduces boundary effect across frame boundaries. The transform employs a lifting-based scheme and buffers wavelet coefficients at intermediate lifting steps towards the end of one GOP (group of pictures) until intermediate coefficients from the beginning of the next GOP are available. The wavelet transform scheme does not physically break the video sequence into GOPs, but processes the sequence without intermission. In this manner, the system simulates an infinite wavelet transformation across frame boundaries and the boundary effect is significantly reduced or essentially eliminated. Moreover, the buffering is very small and the scheme can be used to implement other decomposition structures. The wavelet transform scheme provides superb video playback quality with little or no boundary effects.

13 Claims, 12 Drawing Sheets $y = x_1 + w*(x_0 + x_2)$

INITIALIZATION PHASE FOR ONE-LEVEL DECOMPOSITION

PIPELINE PROCESSING OF ODD FRAME

PIPELINE PROCESSING OF EVEN FRAME

FLUSH PHASE FOR ONE-LEVEL DECOMPOSITION

INITIALIZATION PHASE FOR
DECODER SYNTHESIS

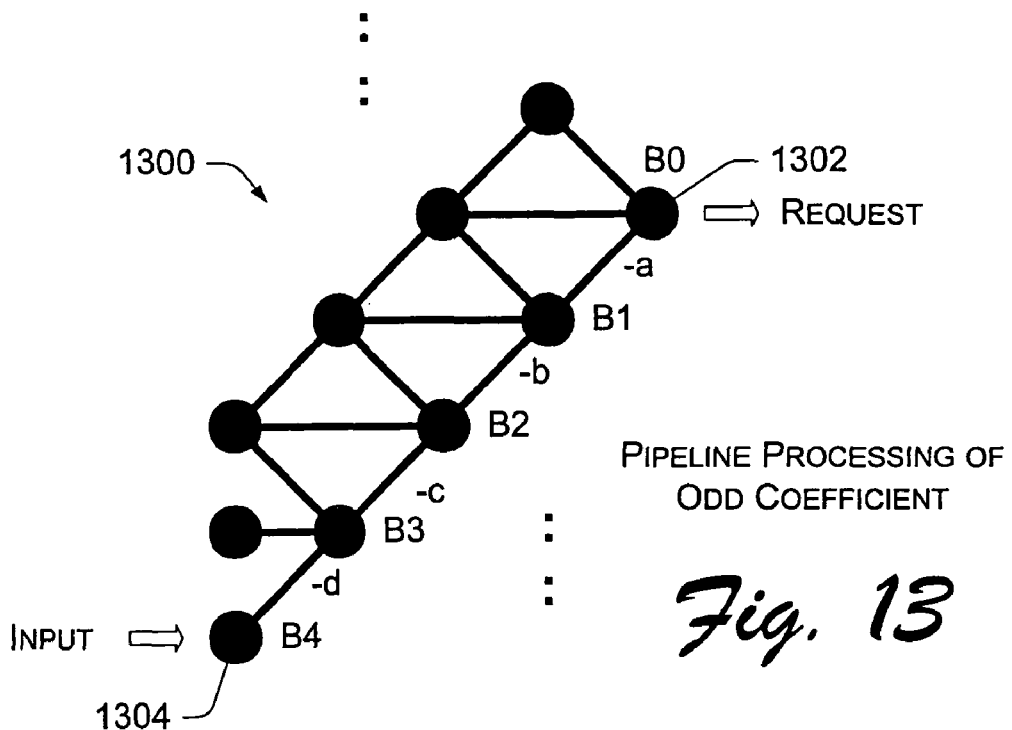
Fig. 13 — Pipeline Processing of Odd Coefficient
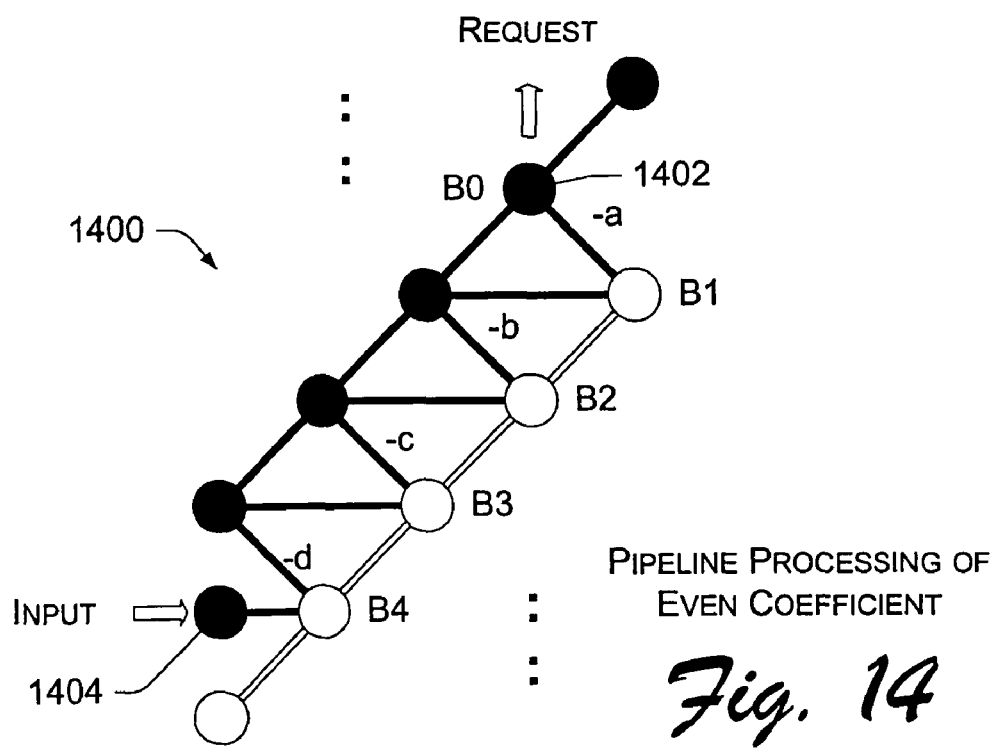
Fig. 14 — Pipeline Processing of Even Coefficient

LIFTING STRUCTURE FOR TWO-
LEVEL WAVELET DECOMPOSITION

MEMORY EFFICIENT 3-D WAVELET TRANSFORM FOR VIDEO CODING WITHOUT BOUNDARY EFFECTS

RELATED APPLICATIONS

This is a continuation of U.S. patent application Ser. No. 09/599,807, filed Jun 21, 2000, which is currently pending.

TECHNICAL FIELD

This invention relates to systems and methods for video coding. More particularly, this invention relates to systems and methods that employ wavelet transforms for video coding.

BACKGROUND

Efficient and reliable delivery of video data is becoming increasingly important as the Internet continues to grow in popularity. Video is very appealing because it offers a much richer user experience than static images and text. It is more interesting, for example, to watch a video clip of a winning touchdown or a Presidential speech than it is to read about the event in stark print.

Unfortunately, video data is -significantly larger than other data types commonly delivered over the Internet. As an example, one second of uncompressed video data may consume one or more Megabytes of data. Delivering such large amounts of data over error-prone networks, such as the Internet and wireless networks, presents difficult challenges in terms of both efficiency and reliability.

To promote efficient delivery, video data is typically encoded prior to delivery to reduce the amount of data actually being transferred over the network. Image quality is lost as a result of the compression, but such loss is generally tolerated as necessary to achieve acceptable transfer speeds. In some cases, the loss of quality may not even be detectable to the viewer.

Video compression is well known. One common type of video compression is a motion-compensation-based video coding scheme, which is used in such coding standards as MPEG-1, MPEG-2, MPEG-4, H.261, and H.263. Such video compression schemes use predictive approaches that encode information to enable motion prediction from one video frame to the next.

An alternative to predictive-based video coding schemes is three dimensional (3-D) wavelet video coding. One advantage of 3-D wavelet coding over predictive video coding schemes is scalability (including rate, PSNR, spatial, and temporal), which facilitates video delivery over heterogeneous networks (e.g., the Internet) and future wireless video services. Existing encoders may use 3-D wavelet coding to seamlessly adapt to different channel conditions, such as bandwidth fluctuation and packet errors/losses, while existing decoders can adapt to different computational resources.

In a typical 3-D wavelet video coder, a two-dimensional (2-D) spatial transform and a one-dimensional (1-D) temporal transform are performed separately. Usually spatial decomposition is applied after temporal decomposition.

FIG. 1 illustrates a 3-D wavelet coding process on a video sequence 100 consisting of multiple 2-D matrices or frames of pixel data 102. The coding process typically segments the sequence into multiple groups of pictures (GOP), as represented by four-frame GOP 104. A first level temporal decomposition is applied to each GOP in the video sequence to produce sequence 110. In this example, a 2:1 compression ratio is used as indicted by shading every other frame. Subsequently, a second level temporal decomposition is applied to each GOP in the video sequence to produce sequence 120. In this example, a 4:1 compression ratio is used in the second level temporal decomposition, as indicated by every fourth frame being shaded.

A spatial decomposition is then performed on the sequence 100 to produce sequence 130. Spatial decomposition is applied with each frame independently. Here, every fourth frame is spatially decomposed.

One drawback of current 3-D wavelet coders is that frame quality or PSNR drops severely at the boundaries between each group of pictures (GOP), sometimes up to several decibels. This results in jittering artifacts in video playback, which can be very annoying to a viewer.

FIG. 2 illustrates the boundary effect in which the resulting image quality fluctuates at boundaries between consecutive GOPs. The lower graph 200 shows consecutive GOPs 1, 2, 3, 4, etc. Each GOP contains five frames. The upper graph 202 shows the visual quality fluctuation within one GOP, such as GOP. 2 Notice that the quality is significantly worse at the first and last frame of each; GOP, causing the jittering artifacts in video playback.

One explanation for this boundary disorder is that conventional wavelet coding schemes improve as the number of frames in each GOP increases. Many schemes assume an infinitely long GOP containing a sequence of infinitely many frames. Unfortunately, GOP length is limited in practice due to delay or memory constraints. Coders and decoders, for example, commonly employ small-size buffers that hold only a few frames at a time. Thus, conventional coding schemes exhibit the boundary effect consistent with the GOP length. If memory was infinitely large, a coder could potentially buffer the whole video sequence and process it as a whole in 3-D wavelet transform and bit-plane coding.

Accordingly, there is a need for a memory efficient 3-D wavelet transform for video coding that reduces or effectively eliminates the boundary effect.

SUMMARY

A video coding system and method utilizes a 3-D wavelet transform that is memory efficient and reduces the boundary effect. The wavelet transform employs a lifting scheme to decompose video frames into wavelet coefficients. The system buffers partially-processed wavelet coefficients at intermediate lifting steps for the last part of one GOP until intermediate coefficients from the beginning of the next GOP are available.

The wavelet transform scheme does not physically break the video sequence into GOPs, but processes the sequence without intermission. As a result, the system simulates an infinite wavelet transformation across GOP boundaries, as if the system were employing infinite memory. The boundary effect is therefore significantly reduced or essentially eliminated. Moreover, the buffering is very small and the scheme can be used to implement other decomposition structures.

A decoding system that employs an inverse 3-D wavelet transform is also disclosed. The wavelet transform scheme provides superb video playback quality with little or no boundary effects.

BRIEF DESCRIPTION OF THE DRAWINGS

FIG. 13 illustrates the lifting structure one-level synthesis of an odd coefficient.

FIG. 14 illustrates the lifting structure one-level synthesis of an even coefficient.

DETAILED DESCRIPTION

This disclosure describes a video coding scheme that utilizes a 3-D wavelet transform that is memory efficient and significantly reduces boundary effect. The coding scheme is described in the context of delivering video data over a network, such as the Internet or a wireless network. However, the video coding scheme has general applicability to a wide variety of environments.

Exemplary System Architecture

Figure 1:
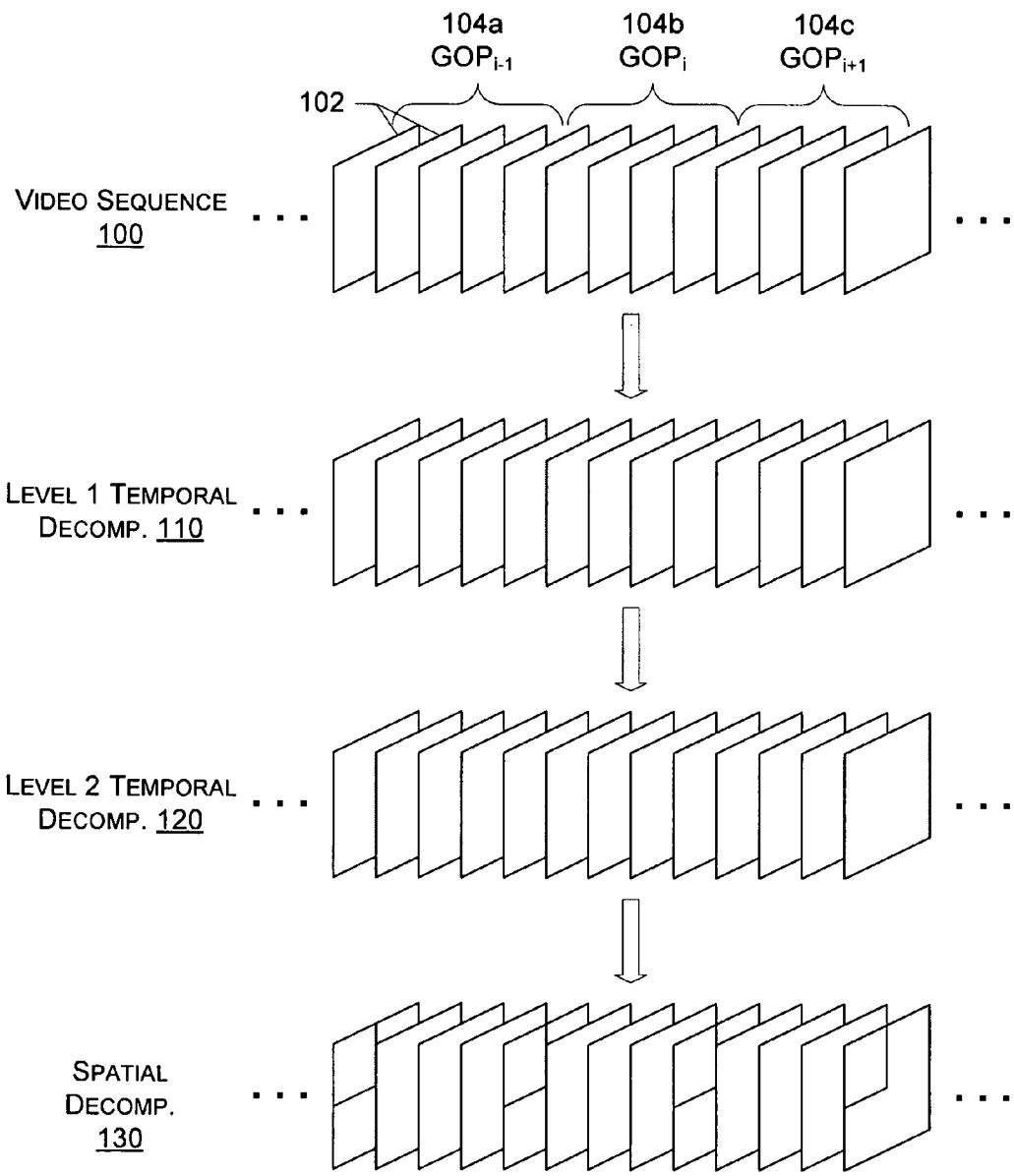
FIG. 1 illustrates frames in a video sequence and a 3-D wavelet coding process on the video sequence 100.
Figure 2:
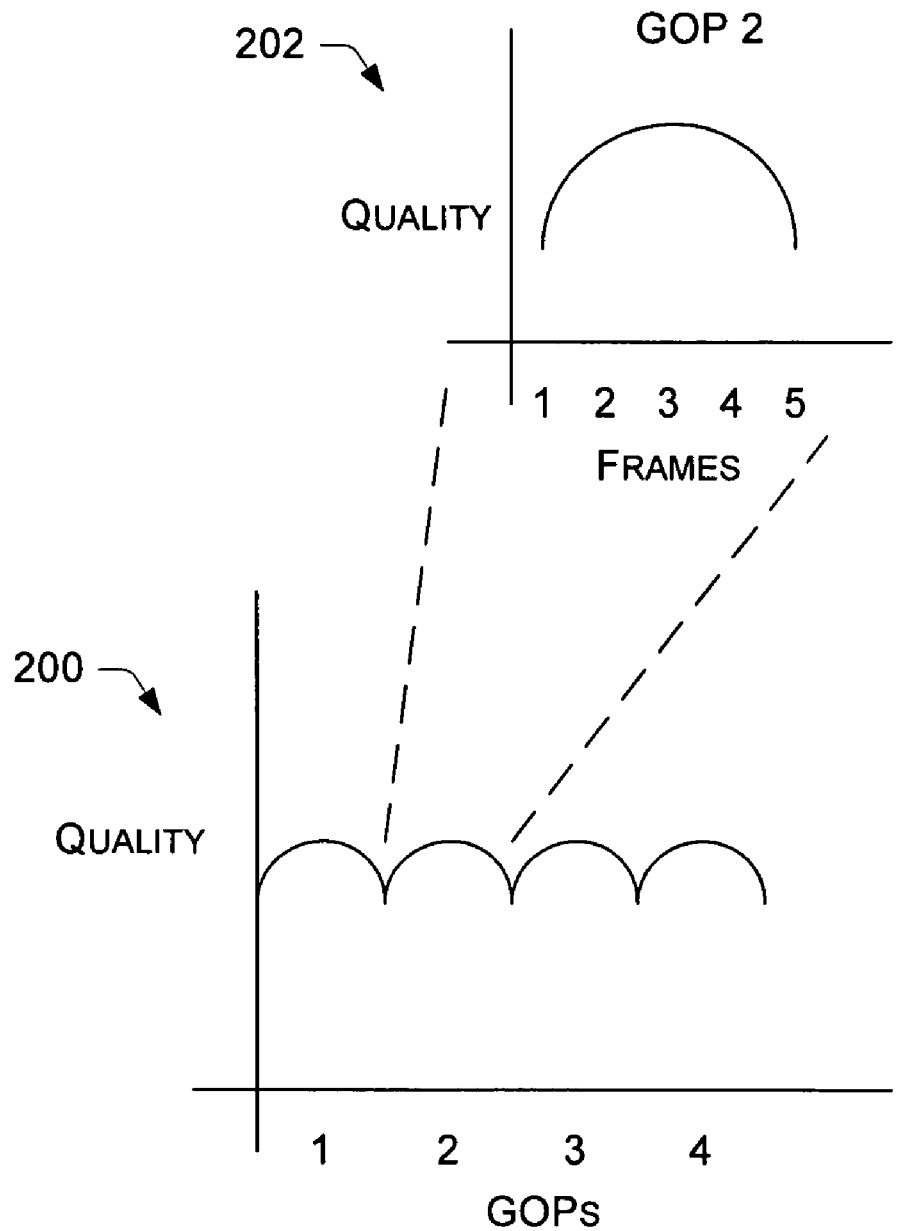
FIG. 2 illustrates a boundary effect in which the image quality due to the coding process fluctuates at boundaries between consecutive groups of pictures (GOPs).
Figure 3:
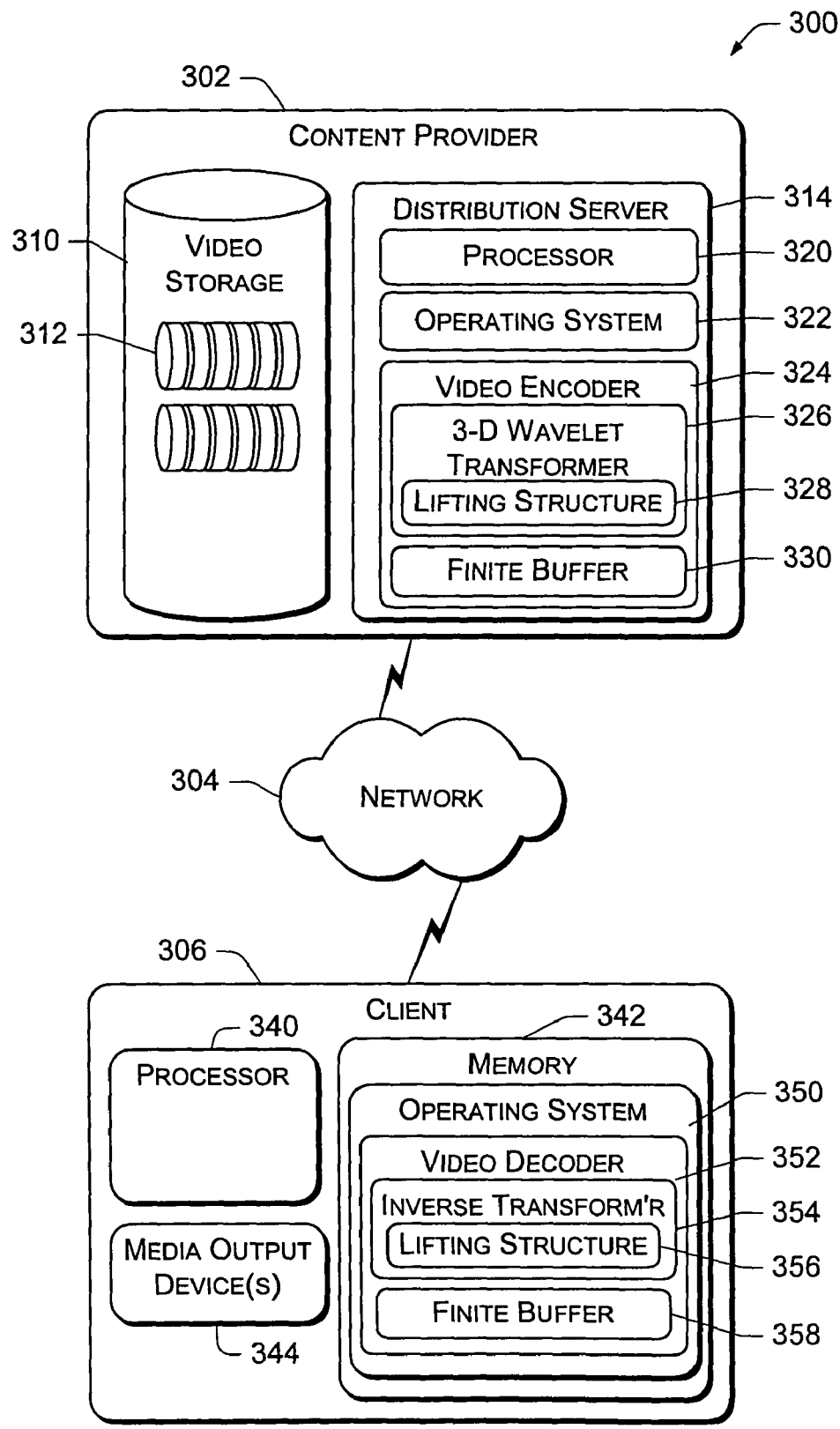
FIG. 3 is a block diagram of a video distribution system, including a video encoder at a content producer/provider and a video decoder at a client.

FIG. 3 shows a video distribution system 300 in which a content producer/provider 302 produces and/or distributes video over a network 304 to a client 306. The network 304 is representative of many different types of networks, including cable, the Internet, a LAN (local area network), a WAN (wide area network), a SAN (storage area network), and wireless networks (e.g., satellite, cellular, RF, microwave, etc.).

The content producer/provider 302 may be implemented in many ways, including as one or more server computers configured to store, process, and distribute video data. The content producer/provider 302 has a video storage 310 to store digital video files 312 and a distribution server 314 to encode the video data and distribute it over the network 304. The server 314 has one or more processors 320, an operating system 322 (e.g., Windows NT, Unix, etc.), and a video encoder 324. The video encoder 324 may be implemented in software, firmware, and/or hardware. The encoder is shown as a separate standalone module for discussion purposes, but may be constructed as part of the processor 320 or incorporated into operating system 322 or other applications (not shown).

The video encoder 324 encodes the video data stored as files 312 using a 3-D wavelet transformer 326. The transformer 326 employs a 3-D wavelet transform scheme in combination with a lifting-based scheme to implement a memory-constrained wavelet analysis. The lifting-based scheme is implemented as a lifting structure 328 of elementary lifting operations, which are described below in more detail.

The 3-D wavelet transformer 326 uses a finite buffer 330 to continuously process sequential video frames, essentially creating an effect of having infinite memory, even though the buffer is rather small. The transformer 326 buffers, coefficients at intermediate lifting steps near the end of one GOP and continues processing until intermediate coefficients from the beginning of the next GOP are available. The wavelet transform scheme does not physically break the sequence into GOPs, but processes the video frame sequence without intermission. In this manner, the boundary effect is significantly reduced or essentially eliminated. Moreover, the buffering is very small and the scheme can be used to implement other decomposition structures.

The client 306 may be embodied in many different ways, including as a computer, a handheld device, a set-top box, a television, a game console, and so forth. The client 306 is equipped with a processor 340, a memory 342, and one or more media output devices 344. The memory 342 stores an operating system 350 (e.g., a Windows-brand operating system) that executes on the processor 340.

The operating system 350 implements a client-side video decoder 352 to decode the video stream. The decoder employs an inverse wavelet transformer 354 to decode the video stream. The inverse transformer 354 uses a lifting structure 356 similar to structure 328 at the encoder 324, but with different lifting coefficient and phase, to perform wavelet synthesis. The inverse transformation is aided by a finite buffer 358 that stores lifting coefficients produced during the synthesis.

Following decoding, the client stores the video in memory 342 and/or plays the video via the media output devices 344. The wavelet transform scheme provides superb video playback quality with little or no boundary effects.

Exemplary Lifting Structure

As noted above, the transformer 326 in encoder 324 utilizes a lifting-based scheme to implement a memory-constrained wavelet analysis. According to the lifting scheme, every FIR (finite impulse response) wavelet or filter bank can be decomposed into lifting steps and each lifting step can be further split into elementary operations.

Figure 4:
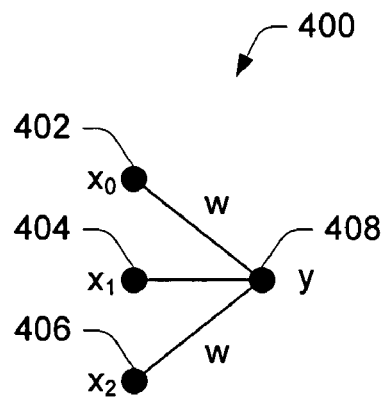
FIG. 4 illustrates a basic element of a lifting structure, which represents an elementary lifting operation employed during video encoding.

FIG. 4 shows a basic element 400 of a lifting structure and represents an elementary lifting operation. The lifting element 400 has three input nodes 402, 18 404, and 406, and one output node 408. Each node denotes a frame of pixel data 19 or wavelet coefficients produced from processing the pixel data. The input frames are labeled as $x_0$, $x_1$, and $x_2$ and the output frame is labeled as y. The structure represents the following function:

$$y = x_1 + w*(x_0 + x_2)$$

The "w" represents a weighting factor, which varies according to the filter type employed. As one example, the filter may be an x9-7 filter that implements nine lifting steps for low pass filtering and seven lifting steps for high pass filtering. However, other filters may be used.

Figure 5:
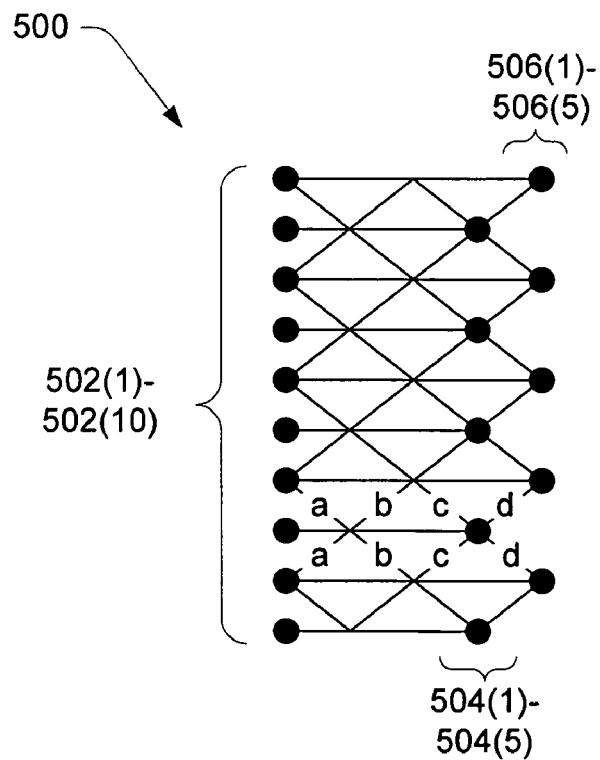
FIG. 5 illustrates a lifting structure formed from multiple basic lifting elements of FIG. 4.

FIG. 5 shows a lifting structure 500 formed by interconnecting multiple basic elements 400. The lifting structure 500 has input nodes 502(1)-502(10). Paths leading from the input nodes represent a lifting algorithm that is applied to the input frames to derive a set of high-pass wavelet coefficients at nodes 504(1)-504(5) and a set of low-pass wavelet coefficients at nodes 506(1)-5,06(5). The "a", "b", "c", and "d" are weighting factors applied to basic elements in the lifting structure, in the manner described above with respect to FIG. 4.

General Video Encoding/Decoding Process

Figure 6:
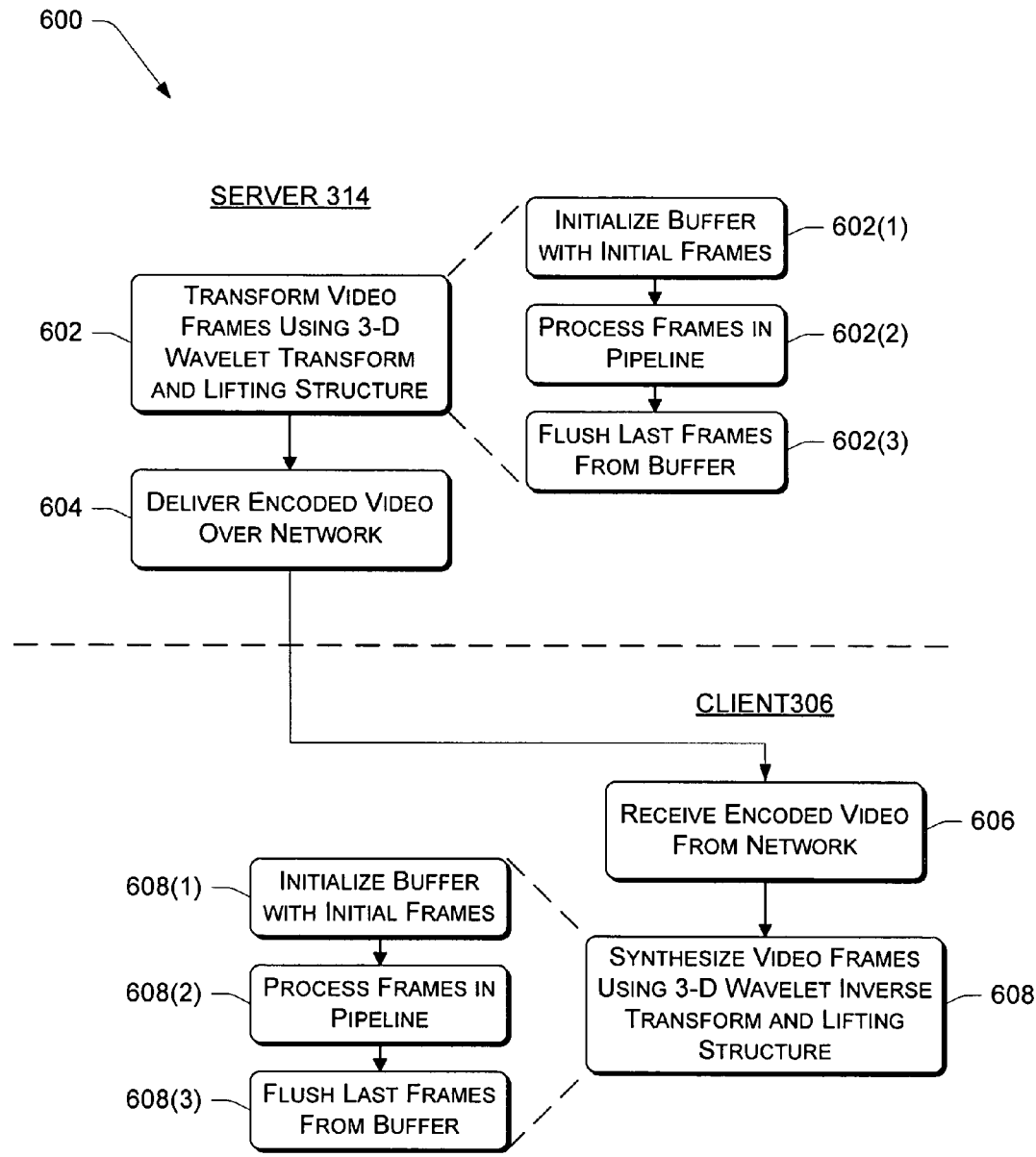
FIG. 6 is a flow diagram of a video encoding/decoding process implemented by the video distribution system.

FIG. 6 shows a general video encoding/decoding process 600, which may be implemented by the video encoder 324 and video decoder 352 of system 300 (FIG. 3). The process 600 may be implemented in software as computer executable instructions that, when executed on one or more processors, perform the operations shown as blocks in FIG. 6.

At block 602, the video encoder 324 decomposes a sequence of video frames using a 3-D wavelet transformation and lifting structure 500. The decomposition operation 602 may be broken into three sub-operations, as represented by blocks 602(1)-602(3). At block 602(1), the wavelet transformer 326 initializes the finite buffer 330 with initial video frames in a video sequence. The transformer 326 then processes the input frames and subsequent frames continuously processes the initial and subsequent frames according to the lifting structure 500 (block 602(2)). Fully-processed coefficients are output from the buffer and partially-processed coefficients at intermediate lifting steps remain in the buffer until a next frame is input. Once a wavelet coefficient is output, buffer space is released and a new frame is pushed into the buffer, thereby allowing ongoing computations. When the last frame is pushed into the buffer, the last set of wavelet coefficients are computed and output (block 602(3)).

At block 604, the content provider 302 delivers the encoded video over network 304 to the client 306. The encoded video includes the wavelet coefficients from the decomposed video. At block 606, the client 306 receives the encoded video and passes the wavelet coefficients to the video decoder 352. The video decoder 352 then decodes the video using wavelet synthesis (block 608).

More particularly, the synthesis operation may be divided into three sub-operations similar to the decomposition operations. At block 608(1), the inverse transformer 354 initializes a finite buffer 358 with initial samples. The inverse transformer 354 then processes the frames using the lifting structure 356 (block 608(2)), until the last frame is pushed into the buffer and processed through the structure (block 608(3)).

The transformation operation 602 and the synthesis operation 608 are described in more detail below.

3-D Wavelet Transformation (Block 602)

The video encoder 324 uses the lifting structure 500 in combination with a limited-size buffer 330 to simulate input and processing of an infinitely long sequence of video frames. The video encoder 324 thus creates the effect of having infinite memory, even though the memory is in fact finite. At GOP boundaries, e encoder buffers partially-processed coefficients at intermediate lifting nodes in structure 500 near the end of one GOP until intermediate coefficients from the beginning of the next GOP are available.

Wavelet decomposition may be performed at one or more levels. To demonstrate the basic transformation, one-level wavelet decomposition is described first, followed by multi-level wavelet decomposition. In this example, he focus is mainly on a 1-D temporal transform for artifact elimination, while spatial transforms are computed using traditional approaches with symmetric extensions over the boundaries. In particular, for purposes of continuing discussion and without losing generality, a wavelet transform using a Daubechies 9-7 biorthogonal filter is described. In the case of a video sequence, the one dimensional input signal is a frame in the video sequence.

For one-level temporal decomposition, the video encoder implements the lifting scheme with minimal buffer size and minimal delay by performing the lifting steps in elementary operations. Considering the lifting structure 500 of FIG. 5, each output frame is at most related to the next four frames. Thus, in one implementation, a small buffer of a size sufficient to hold just five frames of data may be employed. Let B0, B1, B2, B3, and B4 represent the contents of five frame-size areas in buffer 330, and f[n] denote the one-dimensional sequence of input samples, where $n \in [0, N-1]$, N is an even number.

Video frames are pushed into the buffer 330 one by one and a wavelet transform frame containing wavelet coefficients is output immediately when it is available. As noted in FIG. 6, the decomposition consists of three phases: (1) initialization, (2) pipeline processing, and (3) flushing. These three phases are described separately below.

Initialization (Block 602(1))

Figure 7:
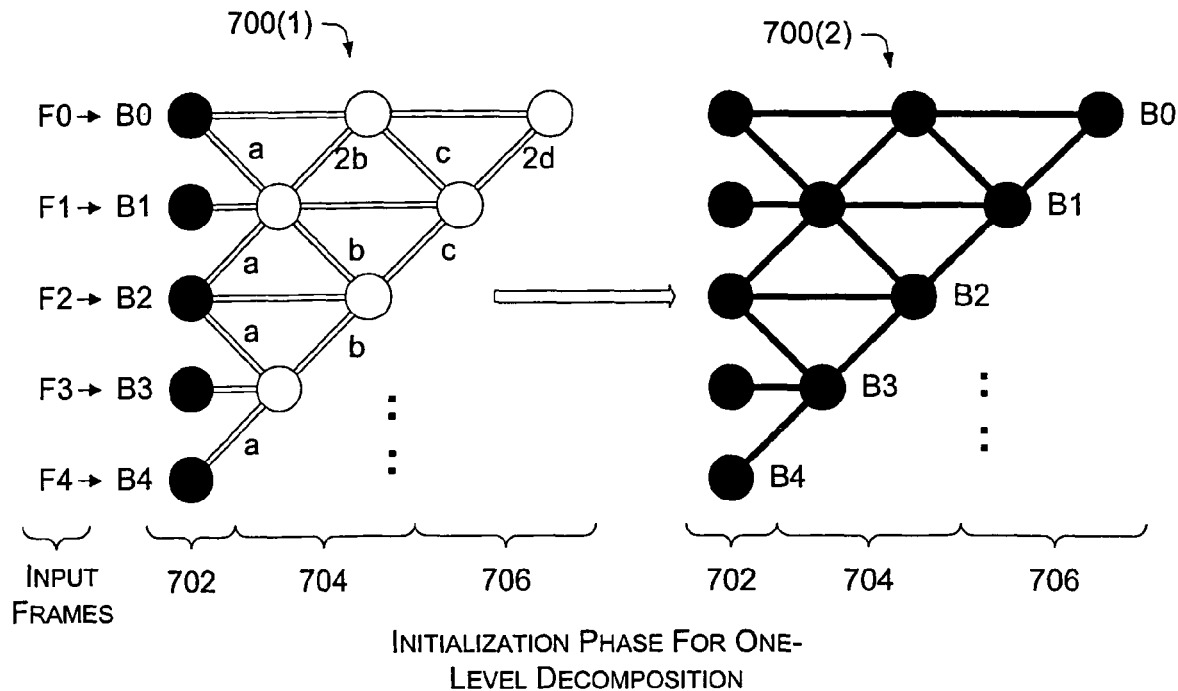
FIG. 7 illustrates two versions of a lifting structure during an initialization operation for a one-level decomposition.

During initialization, the first five frames in a video sequence are pushed into the buffer areas B0-B4 of buffer 330. FIG. 7 shows two views of a lifting structure during the initialization operation for a one-level decomposition. The first view of the lifting structure, represented by reference number 700(1), shows the structure when the initial five frames F0-F4 are loaded into buffer areas B0-B4 at input nodes 702 of the lifting structure.

Throughout this discussion, nodes drawn as solid black dots indicate that data is present and paths drawn in solid black lines indicate that the operations have been performed. Nodes drawn as empty circles indicate that the nodes do not yet contain data and paths drawn as hollow lines indicate that the operations have not yet been performed. Here, data is present at input nodes 702 and not at output nodes 704 and 706. None of the operations has been performed.

Weighting variables a, b, c and d are applied to the various paths. Notice that the weights "2b" and "2d" applied to the topmost basic lifting elements are a symmetric extension to account for the left boundary of the first frame. That is, these weights account for paths that should be leading into the topmost intermediate node 704 and topmost output node 706 from above, as if there were values existing before receipt of the first frame B0.

The second view of the lifting structure, represented by reference number 700(2), shows completion of the initialization phase after the operations have been performed. The intermediate and output nodes 704 and 706 now hold coefficients that result from processing, as represented by their solid black appearance. The paths are also filled to demonstrate that the operations have been performed.

At completion of the initialization operation, the contents of buffer B0 form a wavelet frame that is ready for output. The contents of buffer areas B1-B3 are at various stages of computation and the content of buffer area B4 contains the last initialization frame F4.

Pipeline Processing (Block 602(2))

After initialization, wavelet transform computing is processed in a pipeline. That is, the first wavelet frame is output, freeing the buffer area previously used to hold that wavelet frame (e.g., buffer area B0). The buffer contents are updated to free up a new buffer area to hold a next frame. The buffers are updated by shifting their contents to a next higher buffer area in the structure, as follows:

B0 is output,

B0←B1,

B1←B2, $B2 \leftarrow B3$, $B3 \leftarrow B4$, $B4 \leftarrow$ a new frame.

Notice that a new wavelet frame now resides in buffer area B0 and a new frame is pushed into the buffer area B4.

Figure 8:
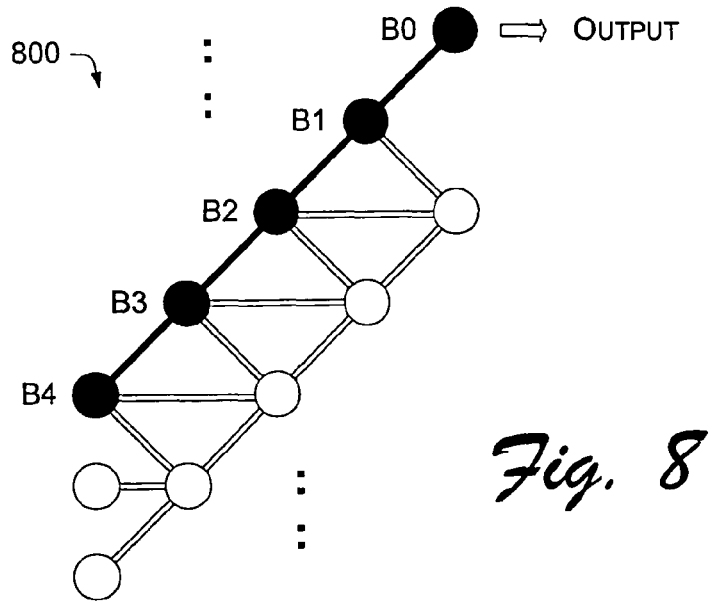
FIG. 8 illustrates the lifting structure just after the initialization operation of FIG. 7.

FIG. 8 shows a version of the lifting structure 800 at a point when the new wavelet frame is output and the buffers are updated, but prior to receiving the next input frame F5 (as represented by the empty nodes and paths). Once the new frame is input to the buffer area B4, the wavelet processing continues according to the lifting structure.

Due to the architecture of the lifting structure 500 (FIG. 5), alternating odd and even frames are computed differently through the various computational paths dictated by the lifting elements. If the input frame is odd-numbered, the following elementary operations are performed:

$B4 \leftarrow B4 + a*B3$, $B3 \leftarrow B3 + b*B2$, $B2 \leftarrow B2 + c*B1$, $B1 \leftarrow B1 + d*B0$, Output B0.

Figure 9:
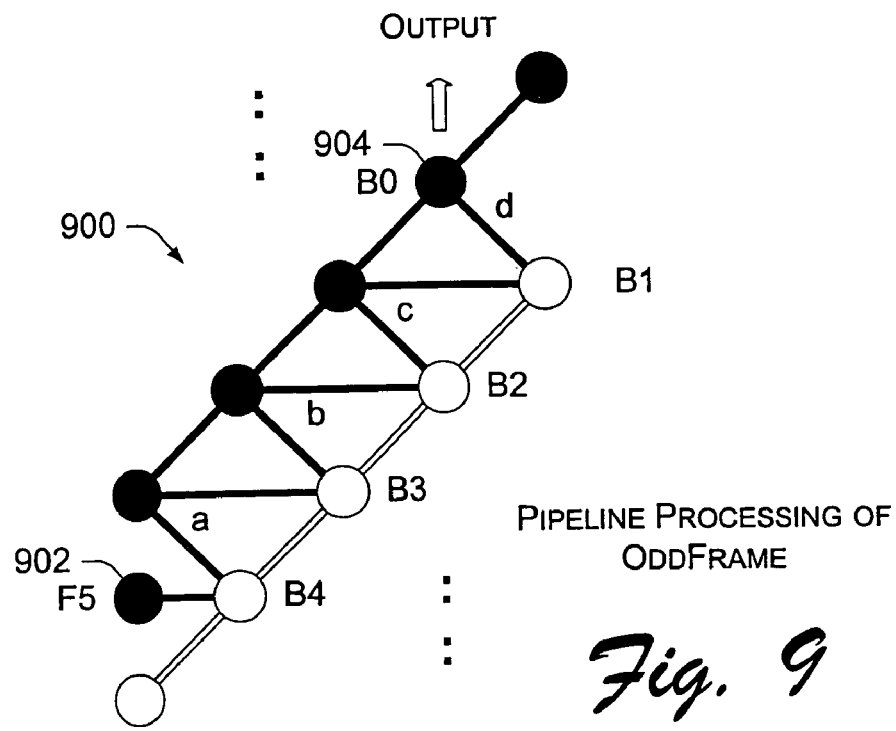
FIG. 9 illustrates the lifting structure during one-level decomposition of an odd frame.

FIG. 9 shows a version of the lifting structure 900 upon input of an odd frame. F5 into buffer area B4 (node 902). The above operations are performed, resulting in an output of a wavelet frame from buffer B0 (node 904).

Conversely, if the input frame is even-numbered, the following elementary operations are performed:

$B3 \leftarrow B3 + a*B4$, $B2 \leftarrow B2 + b*B3$, $B1 \leftarrow B1 + c*B2$, $B0 \leftarrow B0 + d*B1$, Output B0.

Figure 10:
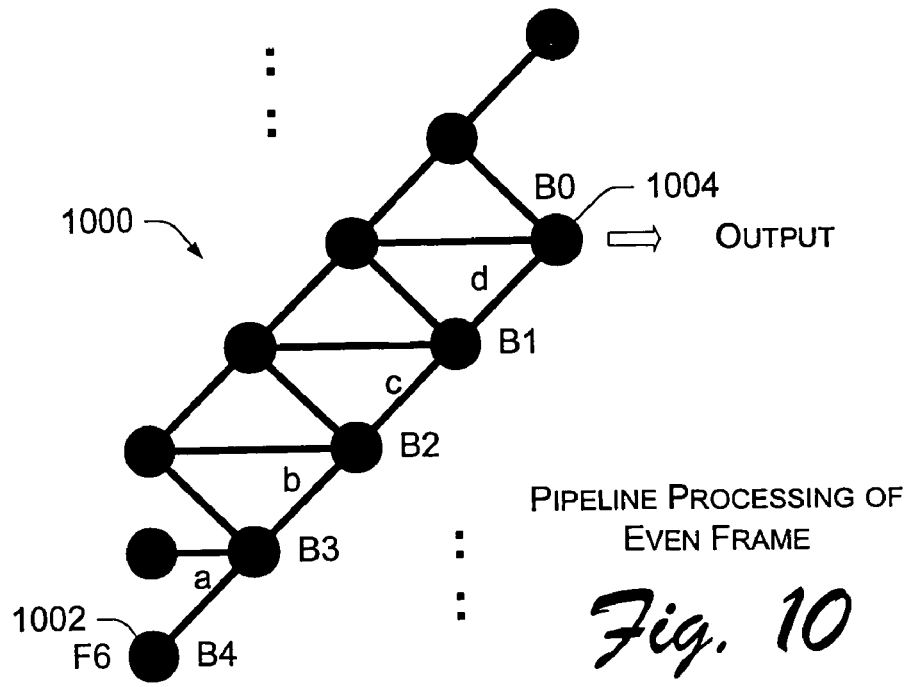
FIG. 10 illustrates the lifting structure during one-level decomposition of an even frame.

FIG. 10 shows a version of the lifting structure 1000 upon input of subsequent even frame F6 into buffer area B4 (node 1002). The above operations are performed, resulting in an output of a wavelet frame from buffer B0 (node 1004).

Flushing Stage (Block 602(3))

Figure 11:
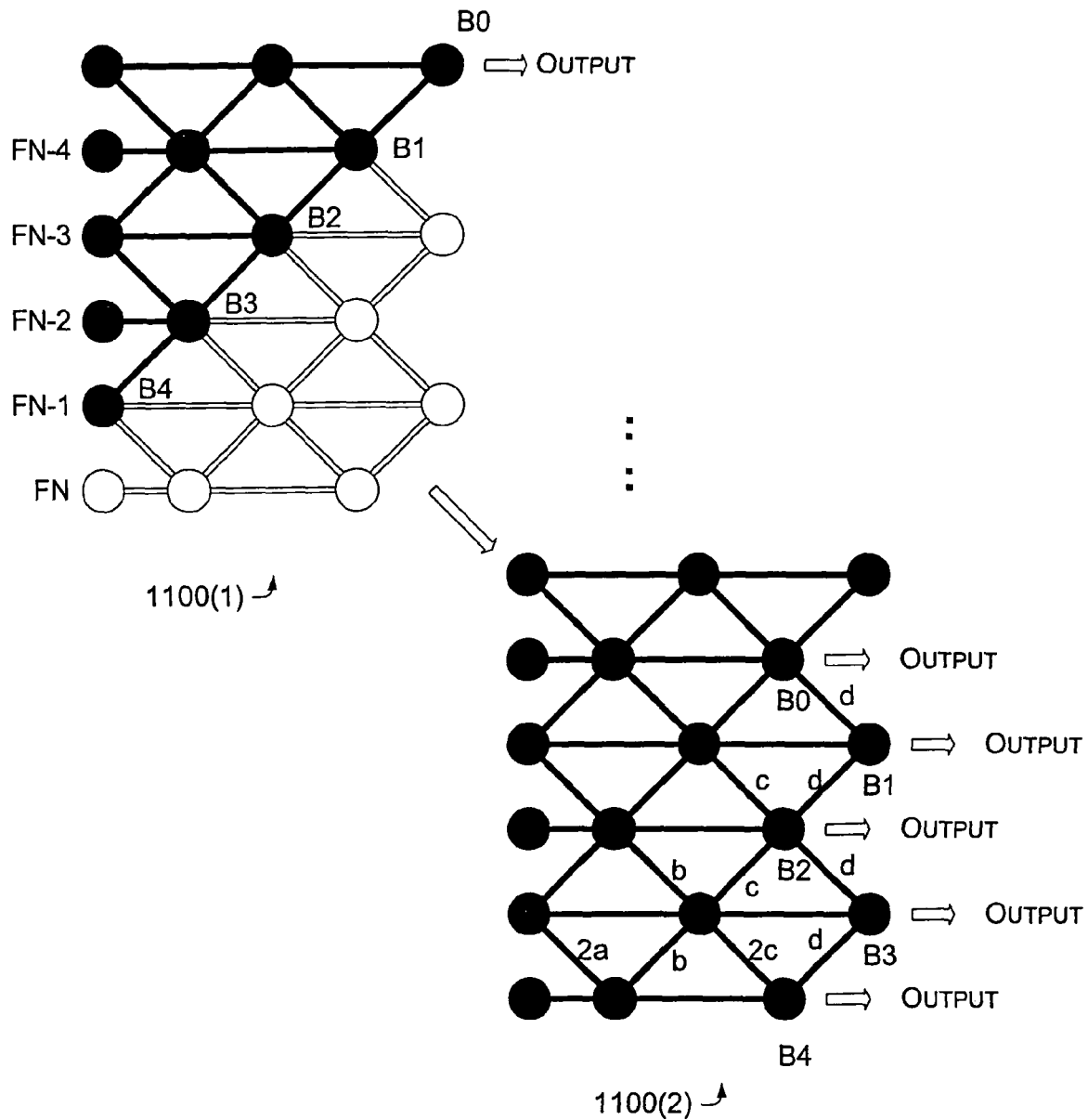
FIG. 11 illustrates two versions of the lifting structure during a flushing stage of the one-level decomposition.

When the last frame is pushed into the buffer, the last five wavelet frames are computed and output. FIG. 11 shows two views of a lifting structure during the flushing stage of one-level decomposition. The first view of the lifting structure, represented by reference number 1100(1), shows the structure when the last five frames FN-4 to FN are loaded into buffer areas B0-B4 at the input nodes of the, lifting structure. The second view of the lifting structure, represented by reference number 1100(2), shows the structure after the final computations are made. Notice that the weights "2a" and "2c" are used to provide a symmetric extension that accounts, for the right boundary of the last frame. These weights simulate an ongoing lifting process, as if the lifting structure was infinite.

Inverse 3-D Wavelet Transformation (Block 608)

The video decoder 352 at the client 306 decodes the video using a wavelet synthesis. The synthesis also uses a lifting structure that is similar to the structure used in decomposition, except that the lifting coefficient and phase are different. In one implementation, a pull model in wavelet synthesis is used. With a pull model, a request is sent whenever a wavelet frame is needed and the synthesis algorithm decides which frames should be loaded into the buffers. The reason for this is that the requests are in natural order while the inputs are not.

Similar to decomposition, the synthesis process consists of three phases: (1) initialization, (2) pipeline processing, and (3) flushing. These three phases are described separately below.

Initialization (Block 608(1))

Figure 12:
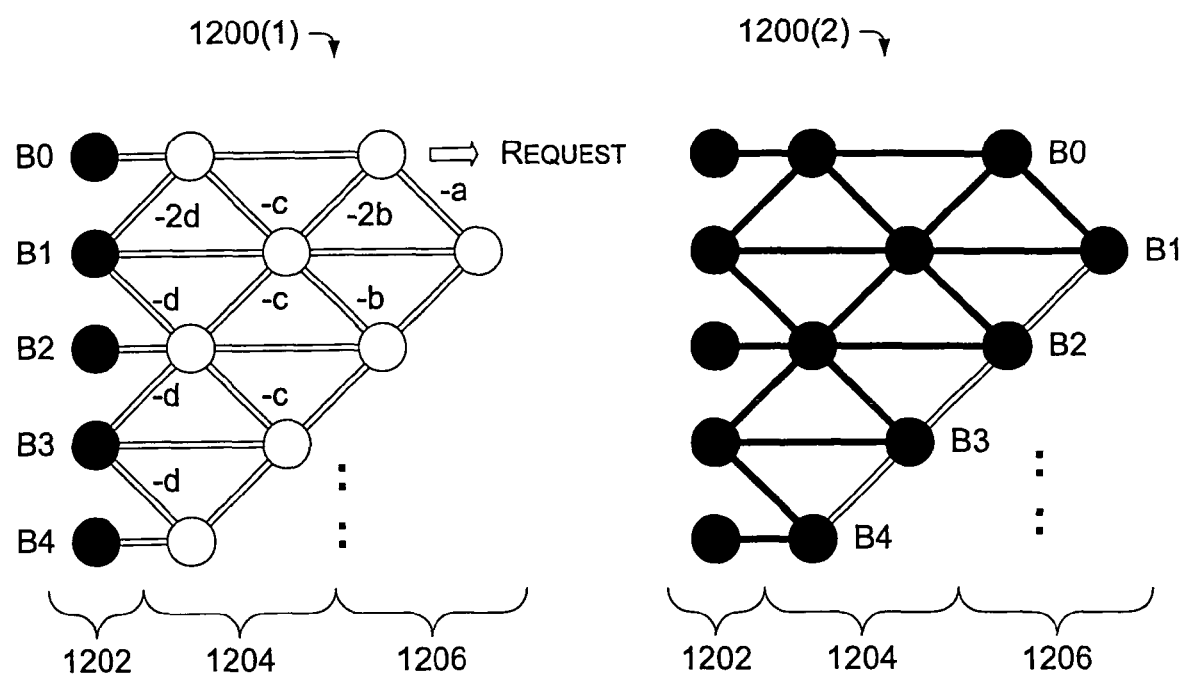
FIG. 12 illustrates two versions of a lifting structure during an initialization operation for a one-level wavelet synthesis.

When the first request is received, initialization is exploited and the first five samples are loaded into the lifting structure. FIG. 12 shows two views of a lifting structure during the initialization operation for a one-level wavelet synthesis implemented at the client. The first view of the lifting structure, represented by reference number 1200(1), shows the structure at the point when a request is made and the first five samples are loaded into buffer areas B0-B4 at input nodes 1202. In view 1200(1), data is present at the input nodes 1202, but no operations have yet been performed.

Negative weighting factors −a, −b, −c and −d are applied to the various paths. Notice that the weighting factors "−2b" and "−2d" are a symmetric extension to account for the left boundary of the first sample.

The second view of the lifting structure, represented by reference number 1200(2), shows completion of the initialization phase after the operations have been performed. The intermediate and output nodes 704 and 706 now hold coefficients that result from processing, as represented by their solid black appearance. Many of the paths are also filled to demonstrate that the operations have been performed.

At completion of the initialization operation, the contents of buffer B0 form a coefficient that is ready to be returned. The contents of buffer areas B1-B4 are at various stages of computation.

Pipeline Processing (Block 608(2))

After initialization, once a request is received, one sample is loaded and one coefficient is returned. This releases the buffer area previously used to hold coefficient (e.g., buffer area B0). The buffers are updated by shifting their contents to the next buffer area in the structure, as follows:

B0 is output, $B0 \leftarrow B1$, $B1 \leftarrow B2$, $B2 \leftarrow B3$, $B3 \leftarrow B4$, $B4 \leftarrow$ a new sample.

Notice that a new coefficient now resides in buffer area B0 and a new sample is pushed into the buffer area B4.

Due to the architecture of the lifting structure, odd and even coefficients are computed differently through the various paths. If the coefficient is odd-numbered, the following operations are performed:

$B3 \leftarrow B3 + (-d)*B4$, $B2 \leftarrow B2 + (-c)*B3$, $B1 \leftarrow B1 + (-b)*B2$, $B0 \leftarrow B0 + (-a)*B1$, Return B0.

FIG. 13 shows a version of the lifting structure 1300 upon output of an odd coefficient from buffer area B0 (node 1302) and input of a next sample to buffer area B4 (node 1304).

Conversely, if the coefficient is even-numbered, the following elementary operations are performed:

$B4 \leftarrow B4+(-d)*B3$, $B3 \leftarrow B3+(-c)*B2$, $B2 \leftarrow B2+(-b)*B1$, $B1 \leftarrow B1+(-a)*B0$, Return B0.

FIG. 14 shows a version of the lifting structure 1400 upon output of an even coefficient from buffer area B0 (node 1402) and input of a next sample to buffer area B4 (node 1404).

Flushing Stage (Block 608(3))

When all the samples are loaded and a new request is received, a flushing phase is performed. During this phase, no sample is loaded and the last four requests are satisfied with the remaining buffer contents.

Multi-Level Decomposition and Synthesis

The encoding/decoding processes described above concern a one-level decomposition and synthesis. However, the wavelet transform may implement multi-level wavelet decomposition and synthesis.

For an N-level decomposition, a "push" model is employed. With a push model, input frames in one level are pushed into the buffer for that level and calculations along the lifting structure are performed. Once an output is ready, the output frame is pushed into the buffer for the next level until reaching the final output buffer.

According to one implementation, each decomposition level has its own independent buffer and the decomposition levels are processed sequentially. Each buffer is sized to hold a specified number of frames (e.g., five frames). For multi-level decomposition, the output of one level is used as the input to the next level. For example, in a two-level Mallat (dyadic) decomposition, the high pass frames of level one are output directly and the low pass ones are pushed into the level two buffer. Using the lifting structure 500 of FIG. 5, each buffer holds five frames for each level. Accordingly, an N-level Mallat wavelet decomposition uses 5N buffers. For other decomposition structures, such as Spa1 and Packet, more than 5N buffers may be warranted. The buffer sizes for various decomposition structures (in terms of frames) are listed in Table 1.

TABLE 1

| Level | Mallat | Spacl | Packet |
|---|---|---|---|
| 1 | 5 | — | — |
| 2 | 10 | 15 | — |
| 3 | 15 | 20 | 35 |
| 4 | 20 | 25 | 40 |

Rather than independent buffers, another implementation is to use a shared buffer. That is, all the buffers are allocated at the beginning of the transforms and all decomposition levels share a common buffer. To avoid inter-level interference, more space is allocated.

Figure 15:
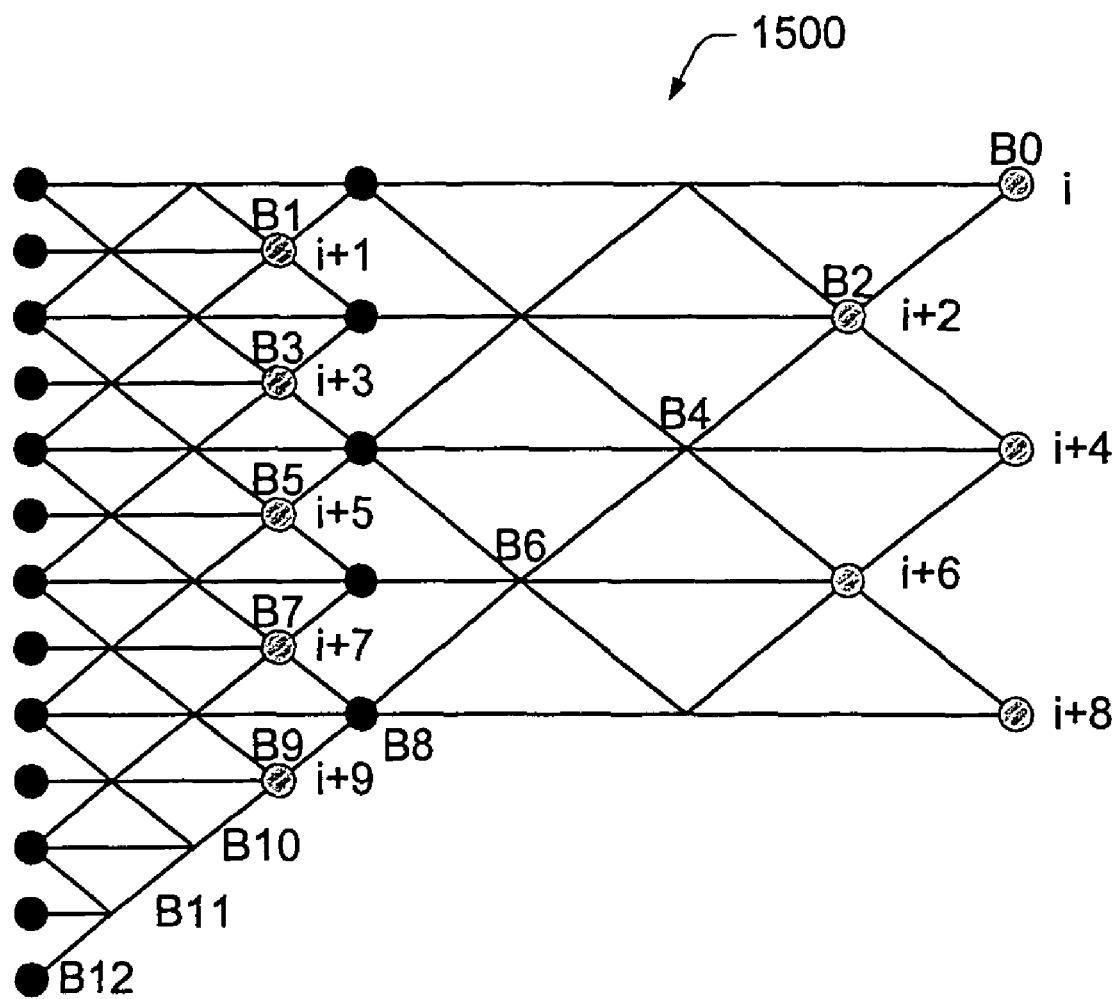
FIG. 15 illustrates a two-level Mallat decomposition structure.

FIG. 15 shows a two-level Mallat decomposition structure 1500, in which buffer areas B1 to B12 are not changed until the node "i" is ready for output. Once buffer area B0 is ready, buffer areas B0 to B3 can be output one by one and the memory will be available for reuse. With this approach, suppose Buf(i) is the minimal buffer requirements (in terms of frames) needed to implement an i-level decomposition, which is given by the following recursive formula:

$Buf(i+1)=Buf(i)+2^{i+2}$, $i \in Z^+$, with $Buf(0)=1$.

The buffer requirements for the Spad1, Packet or other decomposition structures are the same because they are determined only by the decomposition level and by the filter lengths used. Table 2 summarizes buffer requirements (in terms of numbers of frames).

TABLE 2

| Level | Mallat | Spacl | Packet |
|---|---|---|---|
| 1 | 5 | — | — |
| 2 | 13 | 13 | — |
| 3 | 29 | 29 | 29 |
| 4 | 61 | 61 | 61 |

From Tables 1 and 2, the independent-buffer approach is more memory efficient in most cases. However, the output order is irregular in this approach because a wavelet frame is immediately output once it is ready. That is: low-level high pass frames are always output in advance of its original order compared with other wavelet frames due to the process delay. This makes it improper for some coding algorithms with order requirements. Extra buffers are used to facilitate wavelet frame ordering.

In the shared-buffer approach, however, the extra buffers can also be used for frame rearrangement, thus they can guarantee the required order. In addition, the shared-buffer method is more suitable for other decomposition structures. In fact, the buffer requirements are the same for different decompositions, as indicated by Table 2.

Finally, both approaches give the same delay in the wavelet transform. For example, the delay is four frames for one-level decomposition since one output frame is related to four frames. The delay is 12 frames for two-level decomposition because one output frame is related to 12 frames.

Depending on the buffering method used in the wavelet analysis, there are two ways for implementing an N-level wavelet synthesis: independent-buffer method and shared-buffer method. The buffer requirement and delay are the same as in the analysis case.

Experimental Results

A test was performed using the memory-constrained wavelet transform described above. The transform was applied to a 288-frame QCIF "Akiyo" test sequence with a three-level Mallat temporal decomposition followed by a three-level spatial decomposition for each frame. The shared-memory approach was used with a 29-frame memory (See Table 2). The wavelet frames were exactly the same as those obtained by using the conventional transform that buffers the whole sequence (all 288 frames).

To compare our proposed transform scheme with the conventional transform scheme in real coding scenarios, two coding experiments were conducted: uniform quantization and coding and 3-D SPIHT coding. When the proposed transform scheme is used, the transformed frames are divided into GOPs. Note that doing so will not introduce any boundary effect. When the conventional transform scheme is used, however, the frames are divided into 11 GOPs before wavelet transform due to memory constraint. The transform structure is the same in both cases (three-level temporal followed by three-level spatial). After lossy coding (uniform quantization and coding or 3-D SPIHT coding), inverse transform is used to decode the sequence.

Figure 16:
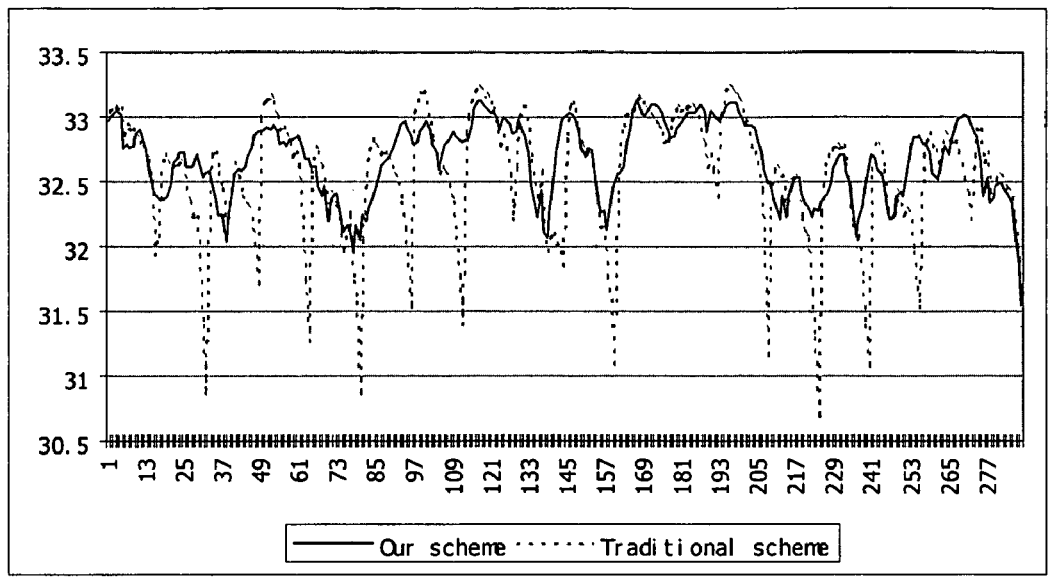
FIG. 16 is a graph that shows PSNR curves for transform schemes using uniform quantization and coding.
Figure 17:
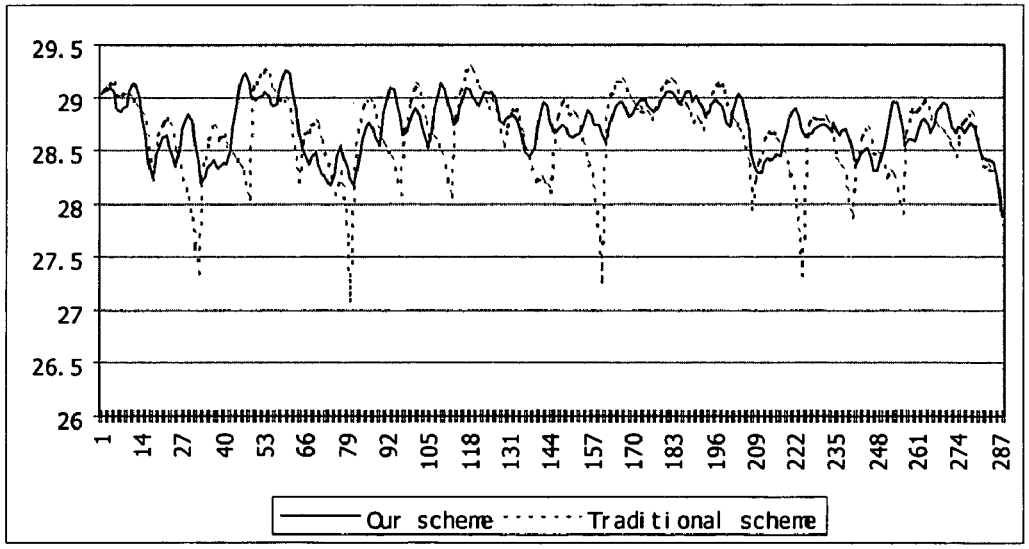
FIG. 17 is a graph that shows PSNR curves for transform schemes using 3-D SPIHT coding at 20 kbps.

FIG. 16 shows PSNR curves from the two transform schemes using uniform quantization (stepsize=64) and coding. FIG. 17 shows the PSNR curves from the scheme using 3-D SPIHT coding at 20 kbps. Uniform bit rate allocation is used for different GOPs in 3-D SPIHT. From these figures, one can appreciate that the transformation scheme described herein solves the PSNR dipping problem at GOP boundaries. The overall average PSNR is about 0.2 dB higher than that corresponding to the conventional scheme. In video playback, the proposed transform scheme gives much smoother and better visual quality because the boundary effects are completely eliminated.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method implemented by one or more processors executing instructions stored in one or more computer readable storage mediums, the method comprising:
   segmenting a finite buffer into a specified number of buffer areas to hold wavelet coefficients computed at different lifting steps of a lifting structure;
   inputting, by the one or more processors, consecutive frames from a video sequence into the finite buffer for encoding the video sequence;
   processing, by the one or more processors, the consecutive frames of the video sequence according to the lifting structure to produce the associated wavelet coefficients;
   buffering the wavelet coefficients at intermediate lifting steps towards an end of the video sequence until intermediate wavelet coefficients from a beginning of a next video sequence are available, the lifting structure being determined by applying weighting factors to partially processed wavelet coefficients at the intermediate lifting steps, at least one weighting factor being a symmetric extension that accounts for a boundary of a frame to simulate an ongoing lifting process by providing values to the buffer areas prior to inputting the consecutive frames to the finite buffer; and
   outputting, by the one or more processors, consecutive wavelet coefficients from the finite buffer such that as one wavelet coefficient is output, buffer space of the finite buffer is freed to receive a next consecutive frame as input in the finite buffer for processing.

2. A method as recited in claim 1, wherein the inputting, the processing, and the outputting are performed continuously.

3. A method as recited in claim 1, wherein the processing comprises performing a one-level wavelet decomposition on the frames.

4. A method as recited in claim 1, wherein the processing comprises performing a multi-level wavelet decomposition on the frames.

5. A method as recited in claim 1, wherein the processing comprises processing the frames using an x9-7 filter.

6. A computer-readable storage medium comprising computer-executable instructions that, when executed by a processor, perform the method as recited in claim 1.

7. A method as recited in claim 1, further comprising determining the lifting structure so that each frame is related at most to four subsequent frames, wherein, as a result, the buffer is segmented in five segments capable of holding a maximum of five frames associated with the video sequence.

8. A video encoder comprising:
   a finite buffer to buffer consecutive frames of a video sequence, the video sequence being input to the video encoder for carrying out a three-dimensional (3-D) coding process on the video sequence using a 3-D wavelet transform for encoding the video sequence, the finite buffer being segmented into a specified number of buffer areas to hold a predetermined number of wavelet coefficients computed at different lifting steps of a lifting structure;
   a transformer implemented by one or more processors in communication with the finite buffer to process the consecutive frames of the video sequence according to the lifting structure to produce the associated wavelet coefficients by buffering the wavelet coefficients at intermediate lifting steps towards an end of the video sequence until intermediate wavelet coefficients from a beginning of a next video sequence are available;
   the lifting structure being determined by applying weighting factors to partially processed wavelet coefficients at the intermediate lifting steps, at least one weighting factor being a symmetric extension that accounts for a boundary of a frame to simulate an ongoing lifting process, the weighting factors differing for odd and even frames such that upon buffering:
      for odd frames, a buffer area receives at least contents of a previous buffer area with the weighting factor applied to the previous buffer area;
      for even frames, the buffer area receives at least contents of a subsequent buffer area with the weighting factor applied to the subsequent buffer area; and
   the finite buffer being configured to output fully computed wavelet coefficients and buffering partially-processed wavelet coefficients in specified buffer areas until a next consecutive frame is buffered to simulate an infinite wavelet transformation across frame boundaries.

9. A video encoder as recited in claim 8, wherein the transformer comprises an x9-7 filter.

10. A video encoder as recited in claim 8, wherein the lifting structure is computed so that each frame is related at most to four subsequent frames, wherein, as a result, the buffer is segmented in five segments capable of holding a maximum of five frames associated with the video sequence.

11. A video encoding method implemented by a processor executing instructions stored in computer-readable storage media, the method comprising:
   segmenting a finite buffer into a specified number of buffer areas to hold a predetermined number of wavelet coefficients computed at different lifting steps of a lifting function;
   inputting consecutive frames from a video sequence into the finite buffer, wherein the video sequence is input for carrying out a three-dimensional (3-D) coding process on the video sequence using a 3-D wavelet transform for encoding the video sequence for preparing the video sequence for transmitting over a network to a video decoder;
   implementing, by the processor, a transformer in communication with the finite buffer to process the consecutive frames of the video sequence using wavelet decomposition according to the lifting structure to produce the associated wavelet coefficients;

generating fully-processed wavelet coefficients associated with at least one of the consecutive frames of the video sequence being prepared for transmission over the network;

outputting the fully-processed wavelet coefficients from the finite buffer;

freeing one of the buffer areas to receive a next consecutive frame as input as a result of each fully-processed wavelet coefficient being output from the finite buffer;

buffering partially-processed wavelet coefficients at intermediate lifting steps at least until a next consecutive frame of the video sequence is received by the finite buffer, the partially-processed wavelet coefficients associated with at least another one of the consecutive frames of the video sequence, the lifting structure being computed by applying weighting factors to the partially-processed wavelet coefficients at the intermediate lifting steps, one or more of the weighting factors used in the lifting steps of the lifting structure being a symmetric extension used to simulate an ongoing continuing lifting process by accounting for a boundary of a frame when the frame is a last frame of the video sequence, the symmetric extension further simulating values of the buffer areas prior to inputting the consecutive frames to the finite buffer; and when the last frame of the consecutive frames of the video sequence is pushed into the buffer, applying a plurality of the weighting factors that are symmetric extensions to the last frame according to the lifting structure to simulate the ongoing continuing lifting process.

12. A video encoding method as recited in claim 11, further comprising computing the lifting structure so that each consecutive frame of the video sequence is related at most to four subsequent frames, wherein, as a result, the buffer is segmented in five segments capable of holding a maximum of five frames associated with the video sequence.

13. A video encoding method as recited in claim 11, further comprising processing the frames by the transformer using an x9-7 filter.

* * * * *